United States Patent
Muraishi

(10) Patent No.: US 11,283,963 B2
(45) Date of Patent: Mar. 22, 2022

(54) IMAGE PROCESSING APPARATUS AND IMAGE PROCESSING METHOD AND STORAGE MEDIUM

(71) Applicant: CANON KABUSHIKI KAISHA, Tokyo (JP)

(72) Inventor: Masaaki Muraishi, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 366 days.

(21) Appl. No.: 16/553,420

(22) Filed: Aug. 28, 2019

(65) Prior Publication Data
US 2020/0084337 A1 Mar. 12, 2020

(30) Foreign Application Priority Data
Sep. 10, 2018 (JP) .............................. JP2018-169119

(51) Int. Cl.
*H04N 1/387* (2006.01)
*H04N 19/122* (2014.01)
(Continued)

(52) U.S. Cl.
CPC .......... *H04N 1/387* (2013.01); *H04N 1/4053* (2013.01); *H04N 1/413* (2013.01); *H04N 19/122* (2014.11);
(Continued)

(58) Field of Classification Search
CPC ....... G06K 2009/4666; G06K 2209/01; G06K 9/34; G06T 2207/10024; H04N 1/387;
(Continued)

(56) References Cited

U.S. PATENT DOCUMENTS 5,680,478 A * 10/1997 Wang ................. G06K 9/00456
382/171
6,002,812 A 12/1999 Cho et al. ..................... 382/300
(Continued)

FOREIGN PATENT DOCUMENTS

JP 2003-008909 1/2003
JP 2007-251518 9/2007
(Continued)

OTHER PUBLICATIONS

Office Action dated May 12, 2020 in counterpart RU Application No. 2019127697, together with English translation thereof.

*Primary Examiner* — Mohammed S Rahaman
(74) *Attorney, Agent, or Firm* — Venable LLP

(57) ABSTRACT

An image processing apparatus converts a multivalued image to a binary image, determines a character region and a non-character region in the binary image, extracts areas in units of a character from the character region, determines whether each of the areas is a character region or a non-character region, and extracts, for each of the areas determined to be the character region, a first representative color from the multivalued image included in the area, and generates a binary image corresponding to the first representative color. The apparatus decides a second representative color closest to a color of a target pixel by comparing the first representative color with the color of the target pixel, and changes the binary image of the area corresponding to the first representative color to a binary image of the decided second representative color.

11 Claims, 14 Drawing Sheets

(51) Int. Cl.
*H04N 1/413* (2006.01)
*H04N 19/25* (2014.01)
*H04N 1/405* (2006.01)
*H04N 19/182* (2014.01)
*G06K 9/46* (2006.01)

(52) U.S. Cl.
CPC ........... *H04N 19/182* (2014.11); *H04N 19/25* (2014.11); *G06K 2009/4666* (2013.01); *G06T 2207/10024* (2013.01)

(58) Field of Classification Search
CPC .... H04N 1/4053; H04N 1/413; H04N 1/6072; H04N 19/103; H04N 19/11; H04N 19/122; H04N 19/176; H04N 19/182; H04N 19/186; H04N 19/25; H04N 19/593
See application file for complete search history.

(56) References Cited

U.S. PATENT DOCUMENTS

| | | | |
|---|---|---|---|
| 6,002,813 A | 12/1999 | Cho et al. | 382/300 |
| 7,133,565 B2 | 11/2006 | Toda et al. | 382/243 |
| 7,567,724 B2 | 7/2009 | Gomi et al. | 382/261 |
| 2002/0037102 A1 | 3/2002 | Toda | 382/168 |
| 2008/0123998 A1 | 5/2008 | Gomi et al. | 382/300 |
| 2008/0231876 A1 | 9/2008 | Harada | 358/1.9 |
| 2010/0054586 A1* | 3/2010 | Yamazaki | G06K 9/342 382/164 |
| 2010/0067023 A1 | 3/2010 | Ito | 358/1.2 |
| 2013/0259363 A1* | 10/2013 | Ozawa | G06K 9/4652 382/164 |

FOREIGN PATENT DOCUMENTS

| | | |
|---|---|---|
| RU | 2221275 | 1/2004 |
| RU | 2006101393 | 8/2007 |

\* cited by examiner

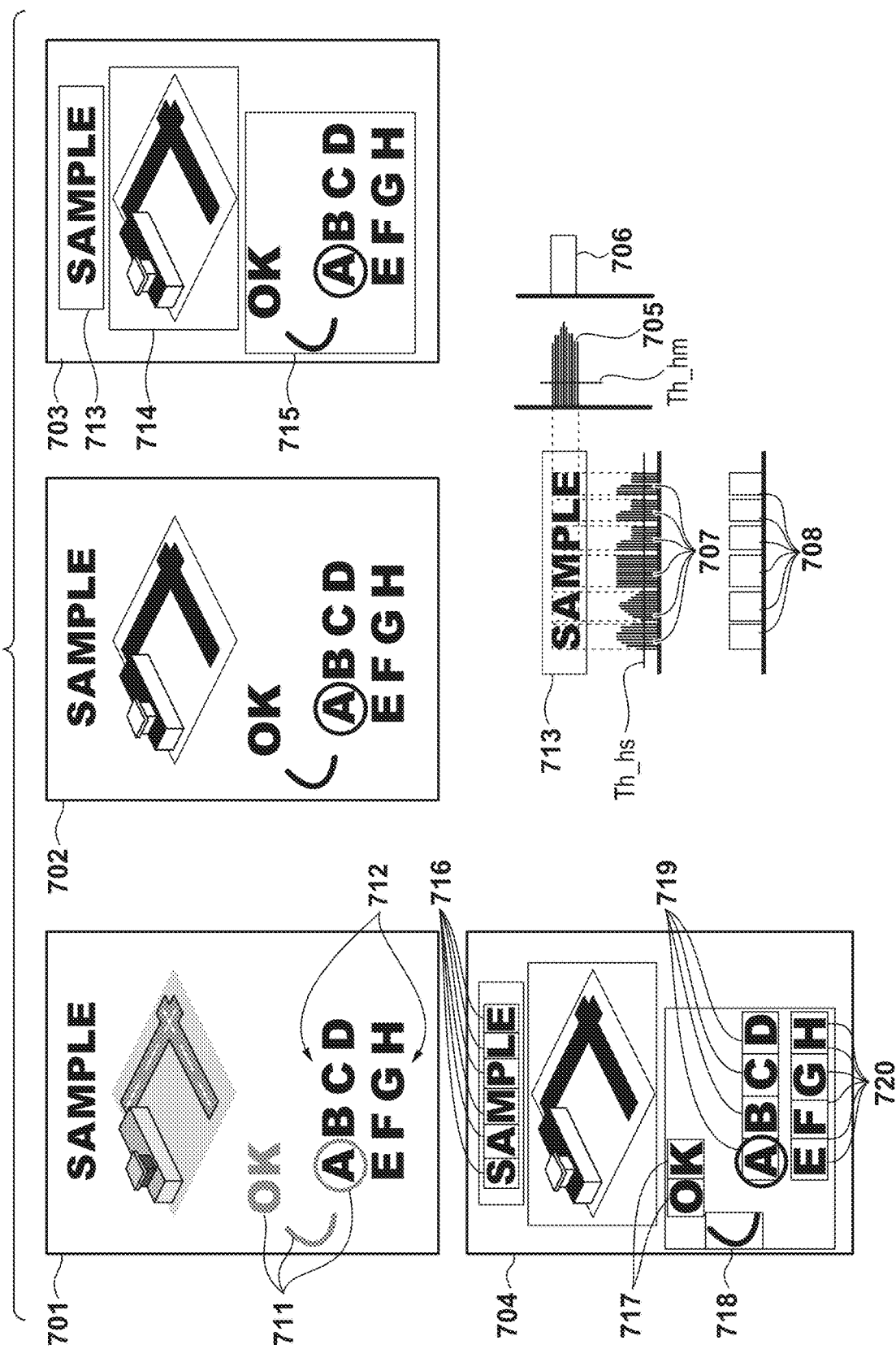

REPRESENTATIVE COLOR(R,G,B) = (20,20,20)

REPRESENTATIVE COLOR(R,G,B) = (255,32,32)

REPRESENTATIVE COLOR(R,G,B) = (98,24,24)

REPRESENTATIVE COLOR(R,G,B) = (20,20,20)

REPRESENTATIVE COLOR(R,G,B) = (255,32,32)

REPRESENTATIVE COLOR(R,G,B) = (98,24,24)

1000
(R,G,B) = (255,32,32)
(L,a,b) = (63,59,31)

1001
(R,G,B) = (20,20,20)
(L,a,b) = (33,0,0)

REPRESENTATIVE COLOR

| No | COLOR VALUE OF REPRESENTATIVE COLOR (R,G,B) | COLOR VALUE OF REPRESENTATIVE COLOR (L,a,b) |
|---|---|---|
| 1 | (20,20,20) | (33,0,0) |
| 2 | (255,32,32) | (63,59,31) |
| 3 | (98,24,24) | (46,33,15) |

COLOR DIFFERENCE BETWEEN TARGET PIXEL AND REPRESENTATIVE COLOR

| No | COLOR DIFFERENCE($\Delta E$) WITH TARGET PIXEL 1000 | COLOR DIFFERENCE($\Delta E$) WITH TARGET PIXEL 1001 |
|---|---|---|
| 1 | 73 | 0 |
| 2 | 0 | 73 |
| 3 | 35 | 39 |

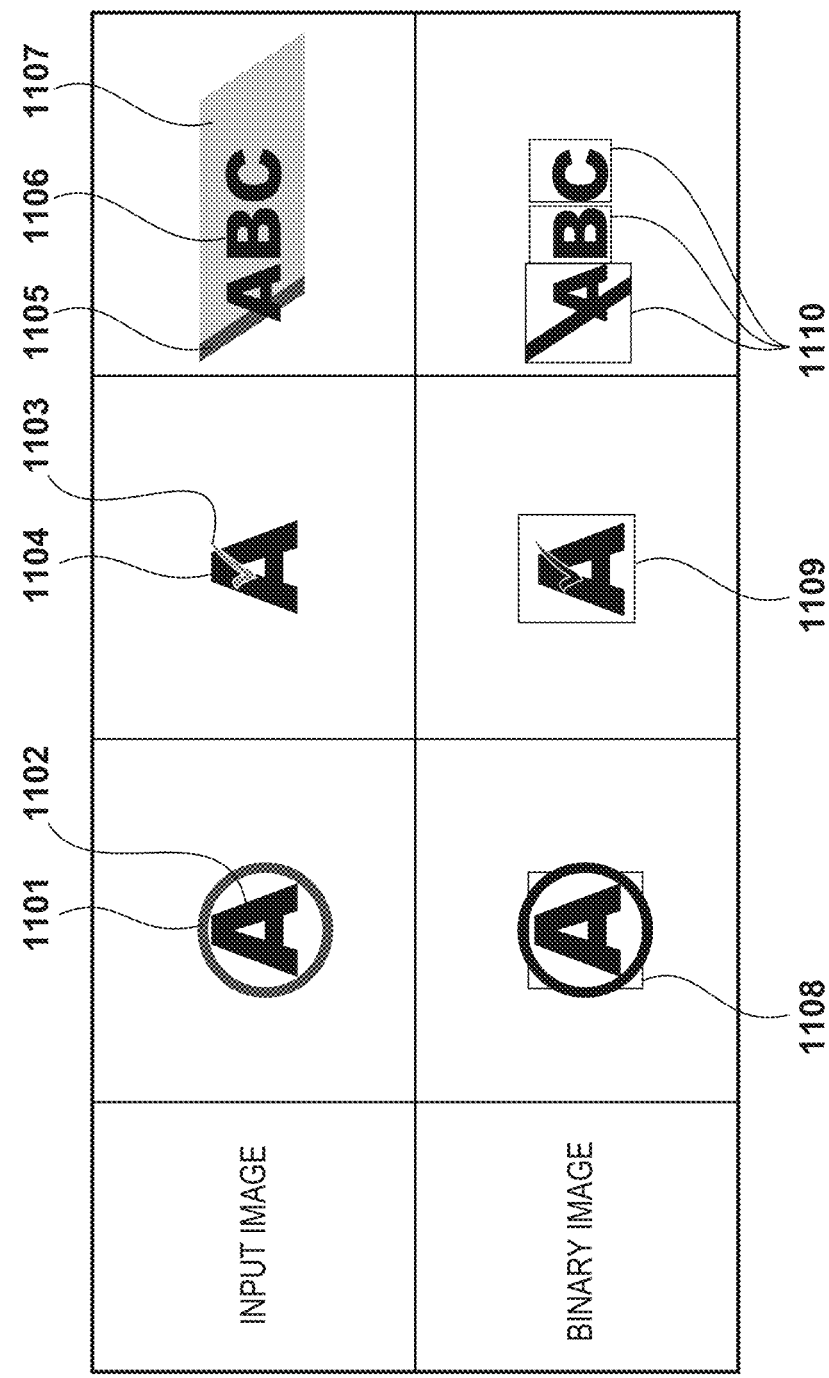

IMAGE PROCESSING APPARATUS AND IMAGE PROCESSING METHOD AND STORAGE MEDIUM

BACKGROUND OF THE INVENTION

Field of the Invention

The present invention relates to an image processing apparatus, an image processing method, and a storage medium.

Description of the Related Art

In recent years, the number of color-printed documents has increased due to widespread use of color printers, color scanners, and the like, and opportunities to perform scanning for reading these documents and to store them as electronic files or transmit them to third parties through the Internet are increasing. However, if the data is handled in full color data, as is, the load on a storage apparatus or a line is large, and therefore the amount of data needs to be reduced by performing compression processing.

As known methods of compressing color image data, there is a compression method in which a color image is converted to a binary image having a pseudo halftone using error diffusion or the like, a compression method in which a color image is converted to a JPEG format, and a compression method in which a color image is converted to 8-bit palette colors and ZIP compression or LZW compression is performed thereon, for example.

Japanese Patent Laid-Open No. 2003-8909 discloses a technology in which a character region included in an input image is detected, each character portion in the character region is converted to a binary image, MMR compression (binary lossless compression) is performed thereon, and the resultant data is saved as a file along with character color information of the character. Moreover, a background image is generated by filling the character portion of the input image with a color of the surrounding area, JPEG compression (lossy compression) is performed thereon while reducing the resolution, and the resultant data is saved in the file. With the file subjected to compression using this compression method, the compression rate can be increased while keeping the quality of the character region high. Also, with the method in Japanese Patent Laid-Open No. 2003-8909, characters in the character region are separated into units of a character, each separated character is assigned with one of representative color values that are calculated with respect to the character region, and as a result, even in a case where characters having a plurality of colors are present in the character region, character colors can be favorably reproduced.

In the method in the aforementioned Japanese Patent Laid-Open No. 2003-8909, projection histograms of black pixels in a main scanning direction and in a sub scanning direction are generated using a binary image obtained by binarizing the input image. Also, break points in the row and column directions are detected from the projection histograms, and as a result, the area for each one character (hereinafter, referred to as "character clipped area") is specified. Here, when a plurality of colors are present in a multivalued image corresponding to the black pixel portion of the binary image in the character clipped area, if the character clipped area is expressed by one representative color, there are cases where the character is reproduced with a color different from the original character color.

FIG. 11 is a diagram for describing a known example in which a character color changes.

The cases include a case where a black character 1102 is surrounded by a red circle frame 1101 in an overlapping manner, and a case where a check mark 1103 is written on a black character 1104 by a red pen or the like, for example. Moreover, a case where markers 1105 and 1107 are drawn with a highlighter or the like on a black character string 1106 is illustrated as an example. When a binary image is generated from the input image in FIG. 11, the black character portion and the portion where the red frame is present, or that is drawn with a red pen or a highlighter are both represented by black pixels after being binarized. In this way, black and red portions that are connected in a binary image cannot be separated from the projection histograms generated from the binary image. With respect to the binary image in FIG. 11, character clipped areas are generated as indicated by reference numerals 1108, 1109, and 1110. In this case, a plurality of colors are present in a multivalued image corresponding to the black pixel portion in one character clipped area. Therefore, if one representative color is assigned to each character clipped area, one color is assigned to one character region, and therefore a character image whose color differs from the original character colors is generated, as described above.

SUMMARY OF THE INVENTION

An aspect of the present invention is to eliminate the above-mentioned problem with conventional technology.

A feature of the present invention is to provide a technique in which, when a character region is binarized, a representative color is assigned, and the character color is reproduced, the character color is suppressed from being changed from the original colors when reproduced.

According to a first aspect of the present invention, there is provided an image processing apparatus, comprising: a memory device that stores a program; and at least one processor that executes the program stored in the memory device to cause the image processing apparatus to function as: a conversion unit configured to convert a multivalued image to a binary image; a first determination unit configured to determine a character region and a non-character region in the binary image; a character clipping unit configured to extract areas in units of a character from a region determined to be the character region by the first determination unit; a second determination unit configured to determine whether each of the areas in units of a character is a character region or a non-character region; a generation unit configured to extract, for each of the areas in units of a character that have been determined to be the character region by the second determination unit, a first representative color from the multivalued image included in the area in units of a character, and generate a binary image of the area in units of a character corresponding to the first representative color; a decision unit configured to decide a second representative color closest to a color of a target pixel by comparing the first representative color with a color of the target pixel in the area in units of a character; and a changing unit configured to change the binary image of the area in units of a character corresponding to the first representative color generated by the generation unit to a binary image of the second representative color decided by the decision unit.

According to a second aspect of the present invention, there is provided an image processing method comprising: converting a multivalued image to a binary image; determining a character region and a non-character region in the binary image; extracting areas in units of a character from a region determined to be the character region; determining whether each of the areas in units of a character is a character region or a non-character region; extracting, for each of the areas in units of a character that have been determined to be the character region, a first representative color from the multivalued image included in the area in units of a character, and generating a binary image of the area in units of a character corresponding to the first representative color; deciding a second representative color closest to a color of a target pixel by comparing the first representative color with a color of the target pixel in the area in units of a character; and changing the generated binary image of the area in units of a character corresponding to the first representative color to a binary image of the decided second representative color.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram for describing a specific example of the processed results of a binarization module, a region determination module, and a character clipping module of the compression/decompression unit according to the first embodiment.

FIG. 11 is a diagram for describing an example of a conventional technology in which a character color changes.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
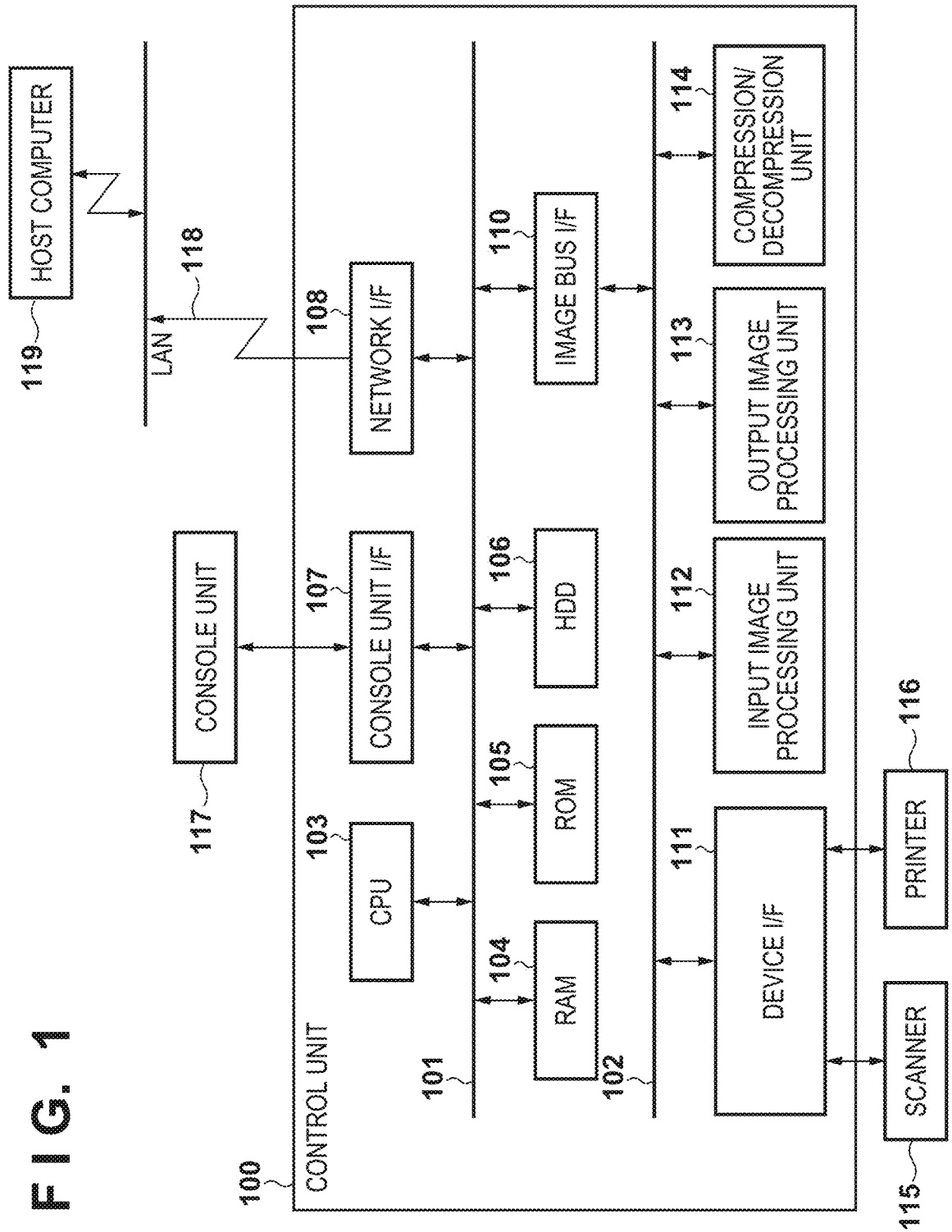
FIG. 1 is a diagram for describing an overall configuration of a system including an image processing apparatus according to a first embodiment of the present invention.

FIG. 1 is a diagram for describing an overall configuration of a system including an image processing apparatus according to a first embodiment of the present invention.

The image processing apparatus is a multi-function peripheral that includes a control unit 100, a scanner 115, a printer 116, and a console unit 117, for example. The control unit 100 is connected to the scanner 115 that reads a document and inputs its image data to the control unit 100, and the printer 116 that prints an image corresponding to image data. Also, the control unit 100 communicates with a host computer 119 via a LAN 118, and receives and outputs image data and device information. A CPU 103 functions as a controller that performs overall control on the image processing apparatus. A RAM (Random Access Memory) 104 is used as a temporary memory for control data or a work memory under the control of the CPU 103. A ROM (Read Only Memory) 105 stores a program to be executed by the CPU 103 and the like. An HDD 106 is a hard disk drive, and stores system software, image data, and the like. The CPU 103 controls the operations of the image processing apparatus by executing a boot program stored in the ROM 105, deploying a program stored in the HDD 106 to the RAM 104, and executing the program. A console unit I/F 107 is an interface unit with the console unit 117, and outputs image data to be displayed by the console unit 117 to the console unit 117. Also, the console unit I/F 107 transmits information input by a user using the console unit 117 to the CPU 103. The user can input various types of instructions to the image processing apparatus by operating the console unit 117. For example, the user designates a destination to which data is to be transmitted, various transmission settings (such as a resolution and a compression rate), and a data format (such as JPEG/TIFF/PDF/PDF high compression).

In the first embodiment, a case is described in which the character color is corrected in a compression technology of a color image, and therefore a case where PDF high compression is designated as the data format will be described as an example. The details of the PDF high compression technology will be described later. A network I/F 108 is connected to the LAN 118, and receives and outputs information. The constituent elements described above are arranged on a system bus 101.

An image bus I/F 110 is a bus bridge that connects the system bus 101 with an image bus 102 that transfers image data at a high speed, and converts the data structure. The image bus 102 is a high speed bus such as a PCI bus or IEEE1394. A device I/F 111 connects the scanner 115 and the printer 116 with the control unit 100 and performs conversion between synchronous and asynchronous systems.

An input image processing unit 112 performs image processing such as shading correction processing, gamma correction processing, color shift correction processing, color conversion processing, and filtering processing on the image data input from the scanner 115. An output image processing unit 113 performs image processing such as color conversion processing and pseudo halftone processing on the bitmap image data to be output to the printer 116. A compression/decompression unit 114 generates later-described compressed data 220 in a PDF format (FIG. 2) by performing PDF high compression processing. The generated compressed data 220 is transmitted to a designated destination (host computer 119, for example) via the network I/F 108 and the LAN 118. Also, the compression/decompression unit 114 can also perform decompression of compressed data received via the network I/F 108 and the LAN 118. The decompressed image data is, after being subjected to the image processing performed by the output image processing unit 113, transmitted to the printer 116 via the device I/F 111 for printing. The details of the compression/decompression unit 114 will be described later.

The scanner 115 converts image information of a document to an electrical signal by exposure-scanning an image on the document with light emitted from an illumination lamp, and inputting reflected light to a linear image sensor (CCD sensor). The scanner 115 further converts the electrical signal to R, G, and B luminance signals, and outputs the luminance signals to the control unit 100 as image data via the device I/F 111. The printer 116 receives image data created in a predetermined image format from the control unit 100, and performs printing on a transfer sheet fed from a feeding unit (not illustrated). Here, an image is printed on a recording sheet, which is a transfer material, through processing of charging, exposure, developing, transferring, and fixing, for example.

Next, the configuration of an image compression processing unit and an image decompression processing unit that are realized by the compression/decompression unit 114 according to the first embodiment will be described with reference to FIGS. 2 and 3. In the first embodiment, the functions of the compression/decompression unit 114 are realized by the CPU 103 executing a program deployed to the RAM 104 from the HDD 106. Alternatively, some of or all of the functions of the compression/decompression unit 114 may be realized by hardware such as ASIC.

As described above, the compression/decompression unit 114 performs PDF high compression processing. Here, the PDF high compression is a technology for compressing color and monochrome multivalued images. In the PDF high compression, region determination is performed on image data, and the image data is compressed by adaptively switching between MMR binary lossless compression and JPEG lossy compression according to the attributes of each region. With this, compression is possible in which the compression rate can be increased, and a high quality image can be obtained with respect to a character region.

Figure 2:
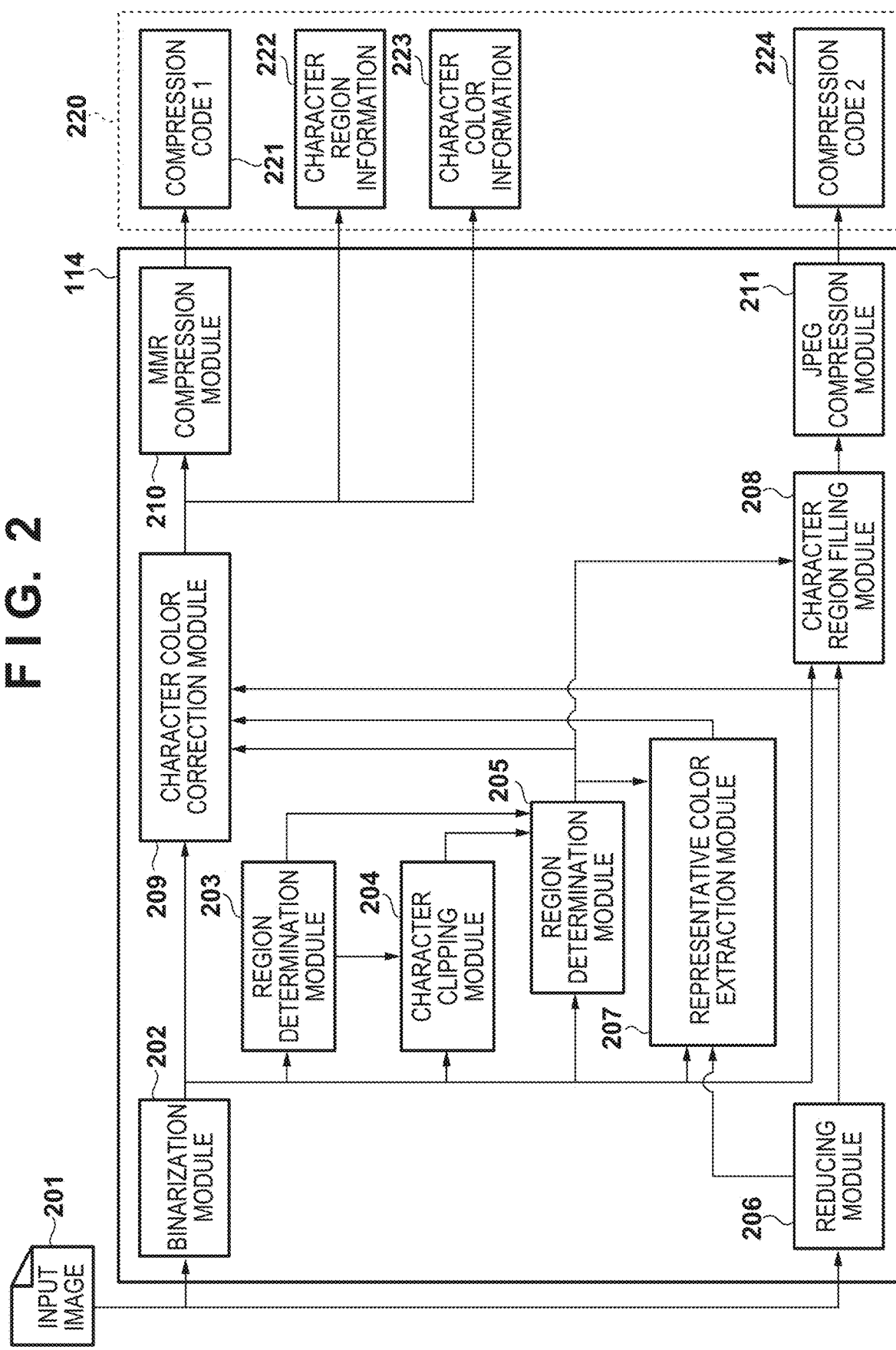
FIG. 2 is a functional block diagram illustrating a functional configuration of a compression processing unit of a compression/decompression unit according to the first embodiment.

FIG. 2 is a functional block diagram for describing a functional configuration of a compression processing unit of the compression/decompression unit 114 according to the first embodiment. Here, a high compression PDF is generated by compressing input image data. Here, a description will be given assuming that the image data to be input to the compression/decompression unit 114 is image data that has been obtained by reading a document using the scanner 115, and has been subjected to processing performed by the input image processing unit 112. Also, FIG. 7 is appropriately referred to while the description is given. Note that, when the functions of the compression/decompression unit 114 are realized by the CPU 103 executing a program, the functions of the functional modules shown in FIG. 2 are realized by the CPU 103 executing a program.

FIG. 7 is a diagram for describing a specific example of the processed results of a binarization module 202, a region determination module 203, and a character clipping module 204 of the compression/decompression unit 114 according to the first embodiment.

The binarization module 202 generates a binary image from an input image 201, which is a multivalued image. In the binary image, a high density pixel, in the input image, whose density is a threshold value or more is a black pixel, for example, and a pixel whose density is less than the threshold value is a white pixel, for example. Of course, the result of binarization may be expressed by other colors, instead of black and white, or by numbers 1 and 0, instead of colors. Also, the threshold value may be a fixed value (128 in 8-bit data, for example), or a method may be used in which a histogram is generated from a multivalued image, and an optimum threshold value for separating between character portions and non-character portions is calculated.

Here, when the input image 201 is an image indicated by a reference numeral 701 in FIG. 7, for example, the binary image subjected to binarization is an image indicated by a reference numeral 702.

In the input image 701, objects indicated by a reference numeral 711 are red, and a black character "A" in a character string 712 is surrounded by a red circle. Also, "BCDEFGH" in the character string 712 are assumed to be black characters. Note that, when the input image 201 is a color multivalued image, binarization is performed with respect to the luminance (Y out of YUV, for example) of the multivalued image.

The region determination module 203 detects character regions in which a character may be included and non-character regions in which no character is included, from the binary image generated by the binarization module 202. Here, the outline will be described using FIG. 14.

Figure 14:
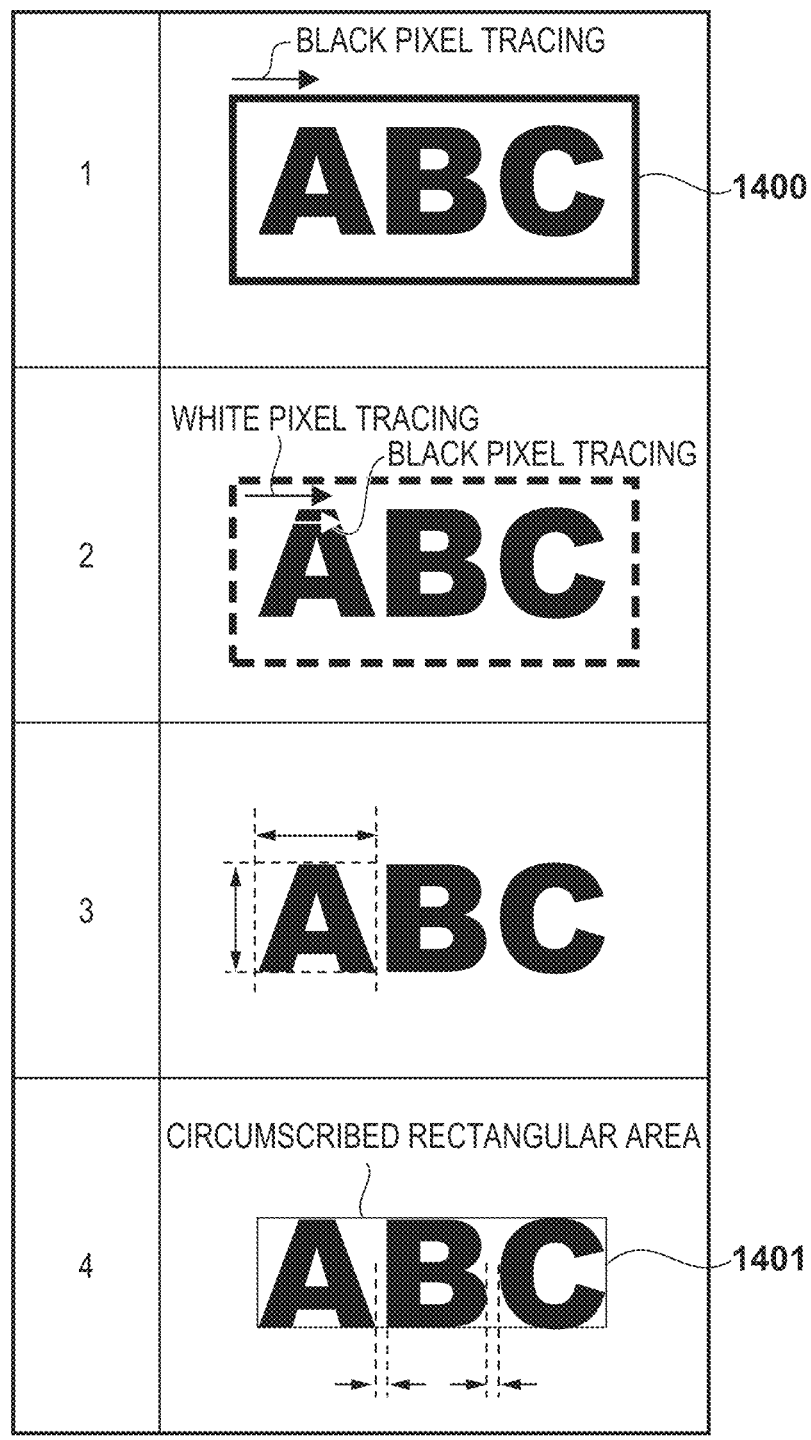
FIG. 14 is a diagram for describing a specific example of region determination in the embodiments.

FIG. 14 is a diagram for describing a specific example of the region determination in the first embodiment.

(1) A cluster of black pixels (black pixel cluster) is extracted by tracing a contour of black pixels with respect to the binary image. In the tracing of a contour, it is determined whether black pixels continue in one of eight directions, namely upper left, left, lower left, lower, lower right, right, and upper right directions. For example, in FIG. 14(1), a black pixel cluster surrounded by a frame line 1400 is extracted.

(2) If a black pixel cluster whose size exceeds a certain size is present in the extracted black pixel cluster, whether a white pixel cluster is present in the region is specified. That is, a white pixel cluster is extracted by tracing the contour of white pixels inside the region of the black pixel cluster. For example, a white pixel cluster is extracted by tracing the contour of white pixels inside the frame line in FIG. 14(2). Moreover, if the size of the extracted white pixel cluster exceeds a certain size, a black pixel cluster is again extracted by tracing the contour of black pixels inside the white pixel cluster. For example, a black pixel cluster is extracted by tracing the contour of a black character portion in FIG. 14(2). These pieces of processing are repeatedly performed until the size of a pixel cluster decreases below a certain size. This processing is performed in order to extract a character region inside a region surrounded by the frame line 1400, for example.

(3) The obtained black pixel cluster is classified into one of a character and a non-character using at least one of the size, the shape, and the black pixel density. For example, if the black pixel cluster has an aspect ratio close to one and a size in a predetermined range, as the character in FIG. 14(3), it can be determined that the black pixel cluster is a black pixel cluster that constitutes a character. Also, it is determined that the remaining black pixel cluster is a pixel cluster that constitutes a non-character.

(4) If the distance between end portions of black pixel clusters that each constitute a character is small, the black pixel clusters are classified into a same group. Then, a circumscribed rectangular area 1401 that includes all of the black pixel clusters that have been classified to the same group is determined to be a character region. For example, if the distances between characters are small, as shown in FIG. 14(4), the character string "ABC" is determined to be one character region. Note that, if another black pixel cluster that constitutes a character is not present in a predetermined distance range, the black pixel cluster that constitutes a character constitutes one group by itself. Therefore, the circumscribed rectangular area of the single black pixel cluster is determined to be a character region. Note that, it is assumed that processing similar to the processing described in the item (4) is performed on the black pixel cluster that constitutes a non-character.

The position of each region obtained in this way, and the attribute determination information (character or non-character) of each of the regions are output as the determination result.

As a result of the processing in the items (1) to (4) described above, when the binary image input to the region determination module 203 is the binary image 702 in FIG. 7, a determination result indicated by a reference numeral 703 in FIG. 7 is output. That is, a determination result is output in which regions 713 and 715 are determined to be character regions in which it is highly possible that a character is included and a region 714 is determined to be a non-character region that does not include a character. The description of the region determination module 203 is as described above.

The character clipping module 204 performs processing for clipping a character clipped rectangle with respect to each of the character regions determined by the region determination module 203. Here, the result obtained by performing clipping of characters with respect to the regions 713 and 715 that have been determined to be character regions by the region determination module 203, as indicated by the reference numeral 703 in FIG. 7, are shown as indicated by a reference numeral 704. The clipped result is as indicated by reference numerals 716, 717, 718, 719, and 720. The clipping processing includes the following pieces of processing.

(1) One of the character regions is selected (the region 713 is selected, for example).

(2) A projection, in a lateral direction, of one binary image specified by the character region is taken. Specifically, the number of black pixels on a line extending in the lateral direction is counted, and the result of counting is the projection. The taken projection is indicated by a reference numeral 705. In the projection 705, lines continuous in a longitudinal direction on each of which the number of black pixels exceeds a threshold value Th_hm form one group. This group is indicated by a reference numeral 706. As a result, with respect to the character region 713, one group has been formed.

(3) A projection in the longitudinal direction is taken with respect to this group. Specifically, the number of black pixels that are present in the longitudinal direction is counted, and the result of counting is the projection. The projection obtained in this way is indicated by a reference numeral 707.

(4) In the projection 707 obtained in the item (3), lines continuous in the lateral direction on each of which the number of black pixels exceeds a threshold value Th_hs form one group. This group is indicated by a reference numeral 708. For example, in the projection 707, six groups are formed. These six groups are respectively constituted by characters of S, A, M, P, L, and E.

(5) A circumscribed rectangle of each group of lines obtained in the item (4) is clipped as a character clipped area. As a result, a circumscribed rectangle of each character is clipped as a character clipped area, for example. The circumscribed rectangles indicated by a reference numeral 716 are obtained by clipping.

(6) The processing of the items (1) to (5) described above is repeated until no character region that has not been selected remains. With the processing of the items (1) to (6), character clipped area results 716, 717, 718, 719, and 720 are output. The description of the character clipping module 204 is as described above.

The region determination module 205 determines whether or not the character image in each character clipped area that has been clipped by the character clipping module 204 is a character, in units of character clipped area. Here, whether or not a character image is a character is determined based on the black pixel density inside the character clipped area, for example. For example, in the case of a character, there are gaps between lines that constitute the character. Therefore, a certain amount of white pixels are present. On the other hand, in the case of a non-character, most of the pixels inside the character clipped area are black pixels, in many cases. Therefore, it is determined that, if the black pixel density is larger than a threshold value, the image is a non-character, and if the black pixel density is smaller than the threshold value, the image is a character. Also, other than this method, the determination may be made based on the aspect ratio of the character clipped area. Moreover, the region determination module 205 corrects the character region information generated by the region determination module 203 and the character clipped area information generated by the character clipping module 204, based on the information of a character clipped area that has been determined to be a non-character by the region determination module 203. That is, information of the character region determined to be a non-character by the region determination module 205 is removed from the character region information generated by the region determination module 203 and the character clipped area information generated by the character clipping module 204.

A reducing module 206 generates a reduced multivalued image by performing reducing processing (resolution reduction processing) on the input image 201. In the first embodiment, the input image is in 300 dpi, and processing for reducing the resolution to 150 dpi is performed.

A representative color extraction module 207 specifies positions of pixels (black pixels) that constitute each character in a binary image based on the character region information corrected by the region determination module 205 and the character clipped rectangle region information. Also, the representative color extraction module 207 calculates the representative color of a character, in units of a character clipped area, by referring to the colors of corresponding positions in the reduced multivalued image based on the specified pixel positions of the character, and obtains character color information regarding each character. Also, the representative color extraction module 207 integrates binary images of the same representative color, and generates an image buffer for each representative color. The representative color is calculated by performing averaging, or weighted averaging on colors of a multivalued image corresponding to a group of pixels that have turned black in the binary image in the character clipped area. Alternatively, the representative color is a color whose frequency is highest in such a group of pixels. Various methods of obtaining the representative color are conceivable, but a color, in the multivalued image, of at least one pixel of the group of pixels that have turned black in the binary image in the character clipped area is used to calculate the representative color. In the first embodiment, an example in which the representative color is calculated by averaging will be described.

Also, in the first embodiment, the multivalued image refers to a reduced multivalued image, but may refer to the multivalued image of an input image.

Next, the result of processing performed by the representative color extraction module 207 will be described with reference to FIGS. 7 and 8A-8C.

The image 701 shown in FIG. 7 is an example of the input image 201, and reference numerals 716, 717, 718, 719, and 720 in the image 704 each indicate a character clipped area generated by the character clipping module 204. An example of the image buffers obtained by classifying the binary images of these character clipped areas with respect to the representative colors extracted by the representative color extraction module 207 is shown in FIGS. 8A to 8C.

Figure 8A:
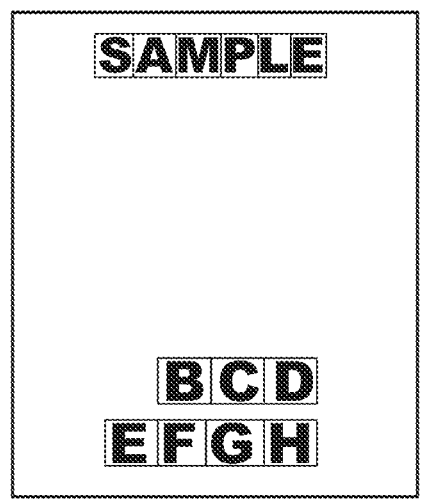
FIGS. 8A to 8C are diagrams for describing an example in which binary images are classified with respect to representative colors extracted by a representative color extraction module according to the first embodiment, and are stored in an image buffer.
Figure 8B:
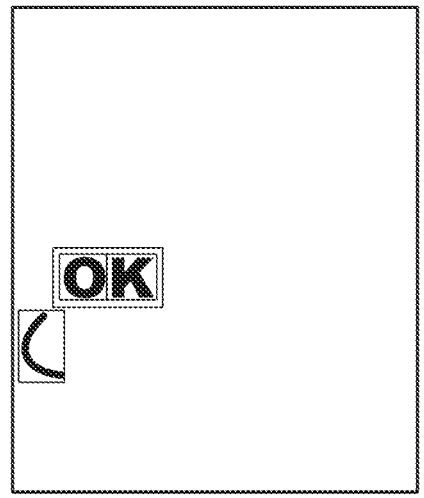
Figure 8C:
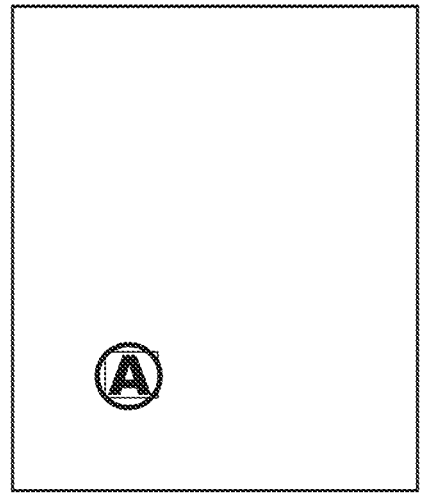

FIGS. 8A to 8C are diagrams for describing an example in which binary images are classified with respect to representative colors extracted by the representative color extraction module 207 according to the first embodiment, and are stored in the image buffers.

FIG. 8A shows a view illustrating a group of character clipped areas whose representative color has been determined to (R,G,B)=(20,20,20). FIG. 8B shows a view illustrating a group of character clipped areas whose representative color has been determined to (R,G,B)=(255,32,32). Also, FIG. 8C shows a view illustrating a group of character clipped rectangular areas whose representative color has been determined to (R,G,B)=(98,24,24).

The detected character clipped area in FIG. 8C is a region, in the input image 701, in which a black character A is surrounded by a red circle. The binarization processing performed by the binarization module 202 is threshold processing, and therefore a high density portion is to be constituted by black pixels. Therefore, with respect to the black character A surrounded by a red circle in the input image 701, both the black character A and red circle portions are converted to black pixels by the binarization processing. In this case, because the black character A and red circle portions are connected in the binary image subjected to binarization, these portions cannot be separated by the processing performed by the character clipping module 204. In this case, the multivalued image corresponding to black pixels inside the one character clipped area includes color values of both black and red. Therefore, the representative color extraction module 207 determines the representative color by calculating an average value of the multivalued image corresponding to the black pixel portion, and determines the color to be used when the black pixel portion inside the character clipped area is to be reproduced. Here, when both black and red colors are present, the average value thereof indicates a brown-like color, and the portion of the character A, which is originally black, and the portion of red circle portion, which is originally red, are to be reproduced in brown.

Therefore, in the first embodiment, the case is suppressed where the character color is reproduced in a color that is different from the original color, by correcting the representative color extracted by the representative color extraction module 207 so as to be a representative color that is close to the color value of the input image. The method of correcting the representative color will be described later.

A character region filling module 208 specifies the positions of pixels (black pixels) that constitute each character in the binary image, based on the character region information generated by the region determination module 205. Also, the character region filling module 208 performs processing for filling pixels at corresponding positions in the reduced multivalued image with the peripheral color, based on the specified positions of the pixels. Here, an average value of pixel values of pixels surrounding a character is used as the peripheral color, and the pixel values of pixels of the character may be replaced by the obtained peripheral color.

A character color correction module 209 corrects the character color information based on the character clipped area information corrected by the region determination module 205, the representative colors of the respective character clipped areas generated by the representative color extraction module 207, and the reduced multivalued image generated by the reducing module 206. The details of the character color correction module 209 will be described later.

An MMR compression module 210 performs MMR compression on a binary image for each representative color generated by the character color correction module 209, and generates a compression code 1 as shown by a numeral 221.

A JPEG compression module 211 performs JPEG compression on a multivalued image subjected to filling processing performed by the character region filling module 208, and generates a compression code 2 as shown by a numeral 224.

In this way, a file of compressed data 220 including the compression code 1, the character region information 222, the character color information 223, and the compression code 2 that have been obtained from the respective constituent elements is generated in the PDF format. The generated file in the PDF format is to be transmitted to the destination designated by the user, as described above.

Figure 3:
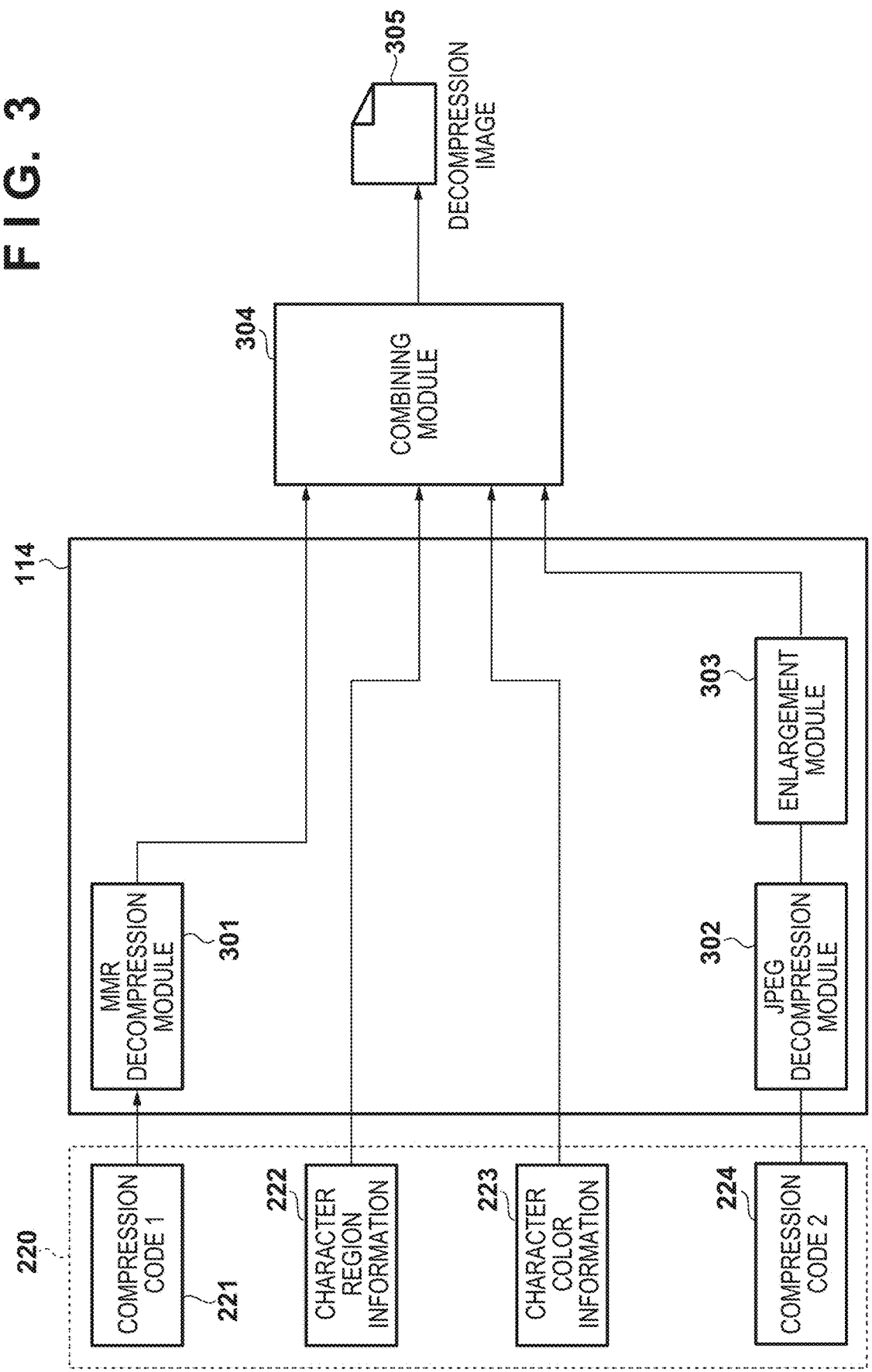
FIG. 3 is a block diagram for describing a configuration for decompressing compressed data in a PDF format that has been transmitted from another apparatus by the compression/decompression unit according to the first embodiment.

FIG. 3 is a block diagram for describing a configuration for decompressing compressed data in the PDF format that has been transmitted from another apparatus by the compression/decompression unit 114 according to the first embodiment. The processing in FIG. 3 is executed when printing is to be performed by decompressing compressed data or the like. Here, a case where the compressed data transmitted from the host computer 119 is in a file format that is the same as the compressed data 220 described above will be described as an example. Note that, when the functions of the compression/decompression unit 114 are realized by the CPU 103 executing a program, the functions of the functional modules shown in FIG. 3 are realized by the CPU 103 executing a program.

An MMR decompression module 301 performs MMR decompression processing on the compression code 1 as shown by a numeral 221 included in the file of the compressed data 220, and reproduces a binary image. A JPEG decompression module 302 performs JPEG decompression processing on the compression code 2 as shown by a numeral 224 included in the file of the compressed data 220, and reproduces a reduced multivalued image. An enlargement module 303 generates a multivalued image having the same size as that of the input image 201 before subjected to compression by performing enlarging processing on the reduced multivalued image that has been decompressed by the JPEG decompression module 302.

A combining module 304 assigns the color (hereinafter, referred to as a "character color") indicated by the character color information to black pixels in the binary image that has been decompressed by the MMR decompression module 301, while referencing to the character region information 222. Moreover, the combining module 304 generates a decompression image 305 by combining the binary image to which the character color has been assigned with a multivalued image generated by the enlargement module 204. When the combining is performed, a transparent color is assigned to white pixels in the binary image, and the background multivalued image can been seen. In this way, the compression/decompression unit 114 generates the decompression image 305 by decompressing the compressed data. This decompression image 305 is, after being subjected to image processing performed by the output image processing unit 113, transmitted to the printer 116 via the device I/F 111 and printed.

Figure 4:
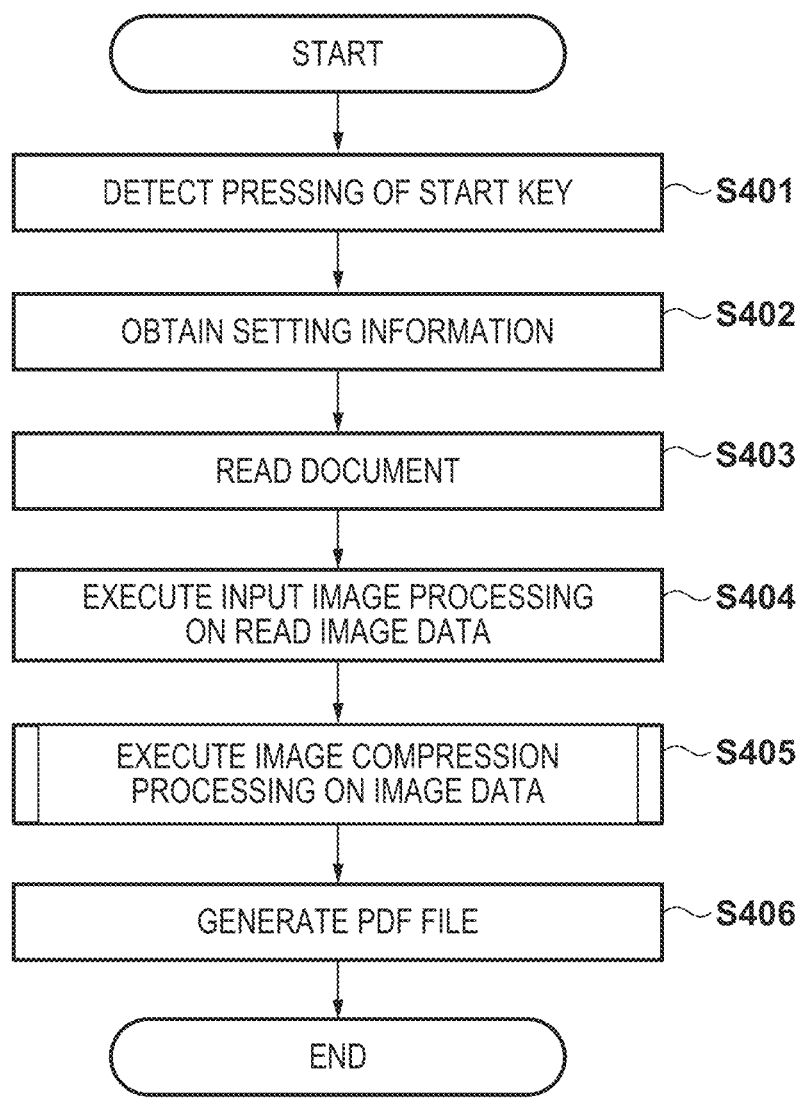
FIG. 4 is a flowchart for describing processing from reading a document until generating a file in the image processing apparatus according to the first embodiment.

FIG. 4 is a flowchart for describing processing from reading a document until generating a file in the image processing apparatus according to the first embodiment. The processing shown in the flowchart in FIG. 4 is achieved by the CPU 103 executing a program deployed in the aforementioned RAM 104.

First, in step S401, the CPU 103 detects pressing of a start key (not illustrated) on the console unit 117. Next, the CPU 103 advances the processing to step S402, and obtains setting values (such as a file format, resolution, and a transmission destination) that have been set by the user using the console unit 117. Then, the CPU 103 advances the processing to step S403, and reads a document by controlling the scanner 115. Also, the CPU 103 advances the processing to step S404, and executes processing in which the input image processing unit 112 is caused to execute image processing on image data obtained by the scanner 115 having read a document in step S403, and the image data subjected to the processing is stored in the RAM 104. Next, the CPU 103 advances the processing to step S405, generates compressed data 220 by causing the compression/decompression unit 114 to perform image compression processing on the image data stored in the RAM 104. The details of generation flow of the compression code 1, the character region information 222, and the character color information 223 will be described later with reference to the flowchart in FIG. 5. Then, the CPU 103 advances the processing to step S406, generates a file in the PDF format from the compressed data 220 generated by the compression/decompression unit 114, and ends this processing.

Figure 5:
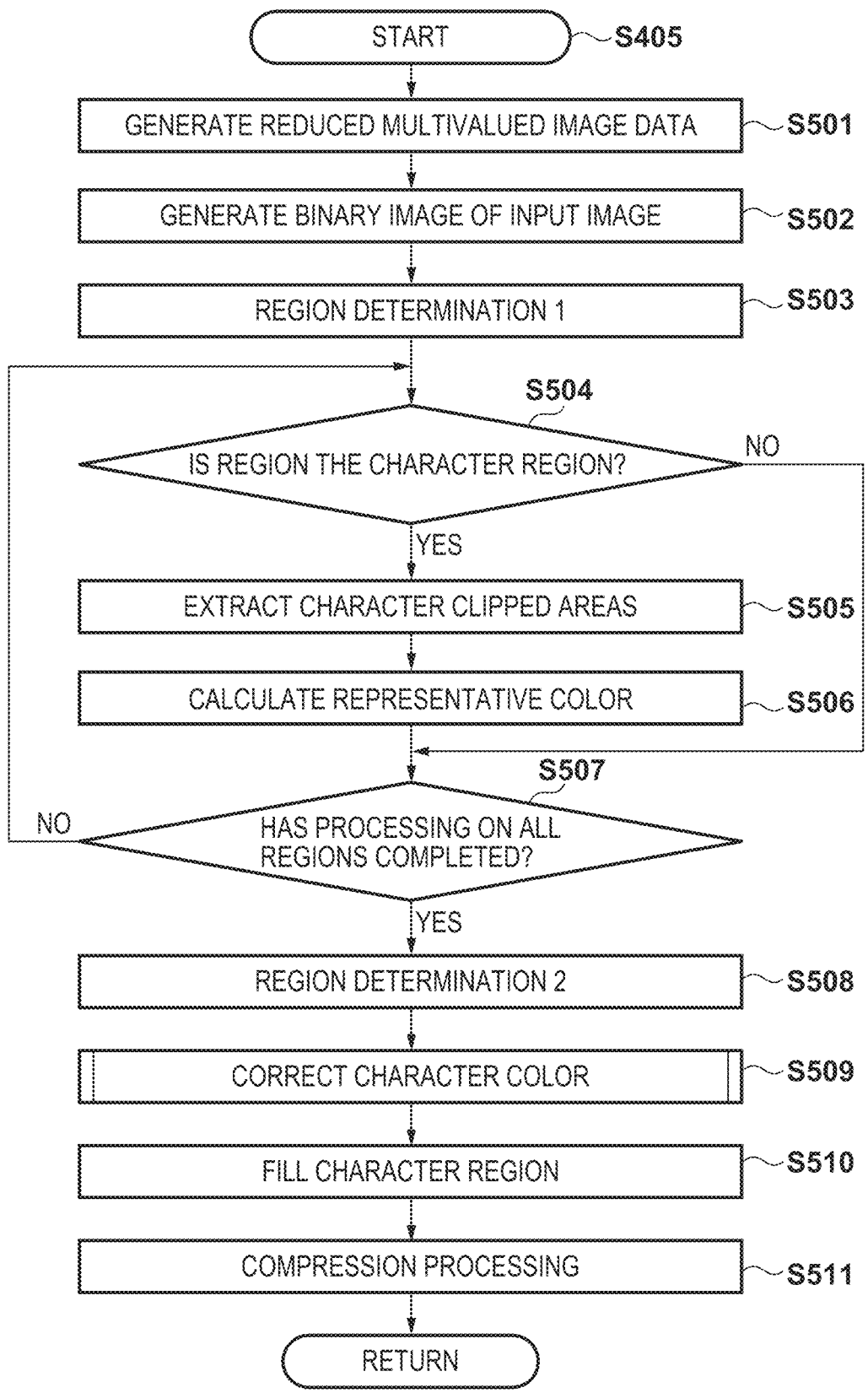
FIG. 5 is a flowchart for describing processing for compressing image data by the compression/decompression unit, which is shown in step S405 in FIG. 4.

FIG. 5 is a flowchart for describing processing for compressing image data by the compression/decompression unit 114, which is shown in step S405 in FIG. 4. Here, a description will be given assuming that the functions of the compression/decompression unit 114 are realized by the CPU 103 executing a program.

First, in step S501, the CPU 103 functions as the reducing module 206, and generates reduced multivalued image data by executing image reducing processing on the input image 201. Next, the CPU 103 advances the processing to step S502, functions as the binarization module 202, and executes binarization processing on the input image 201. Next, the CPU 103 advances the processing to step S503, functions as the region determination module 203, executes region determination processing 1 on the binary image generated in step S502, identifies regions included in the binary image, and determines whether each identified region is a character region or a non-character region.

Then, the CPU 103 advances the processing to step S504, functions as the region determination module 205, sequentially sets one of the regions determined by the region determination module 203 as a target region, and determines whether or not the determination result of the region determination module 203 with respect to the target region is a character region. Here, if the target region is the character region, the CPU 103 advances the processing to step S505, and if the target region is a non-character region, the CPU 103 advances the processing to step S507. In step S505, the CPU 103 functions as the character clipping module 204, and extracts character clipped areas in units of a character from the target region determined to be the character region. Next, the CPU 103 advances the processing to step S506, functions as the representative color extraction module 207, calculates a representative color indicating the color of the binary image for each character clipped rectangular area generated by the character clipping module 204. Then, the CPU 103 advances the processing to step S507, determines whether or not the processing in steps S504 to S506 has been completed with respect to all the regions generated by the region determination module 203, and if it is determined that the processing has been completed with respect to all the regions, the CPU 103 advances the processing to step S508, and if not, the CPU 103 advances the processing to step S504.

In step S508, the CPU 103 functions as the region determination module 205, determines whether or not each character clipped area generated in step S505 is a character, and corrects determination regarding the character region. Specifically, the character regions are corrected by removing, from the character regions extracted in step S503, a character clipped area that has been determined to be a non-character in the determination processing performed by the region determination module 205. Next, the CPU 103 advances the processing to step S509, functions as the character color correction module 209, and corrects the representative color for each character clipped area calculated by the representative color extraction module 207. The details of this processing will be described later with reference to FIG. 6. Next, the CPU 103 advances the processing to step S510, functions as the character region filling module 208, and performs processing in which the pixels in a character portion are filled with a peripheral color, with respect to the reduced multivalued image generated by the reducing module 206. Then, the CPU 103 advances the processing to step S511, functions as the MMR compression module 210, and generates a compression code 1 as shown by the numeral 221 by performing MMR compression on the binary image based on the binary image corrected by the character color correction module 209 and the character color information. Also, the CPU 103 functions as the JPEG compression module 211, generates a compression code 2 as shown by the numeral 224 by performing JPEG compression on the multivalued image generated by the character region filling module 208, and ends this processing.

Figure 6:
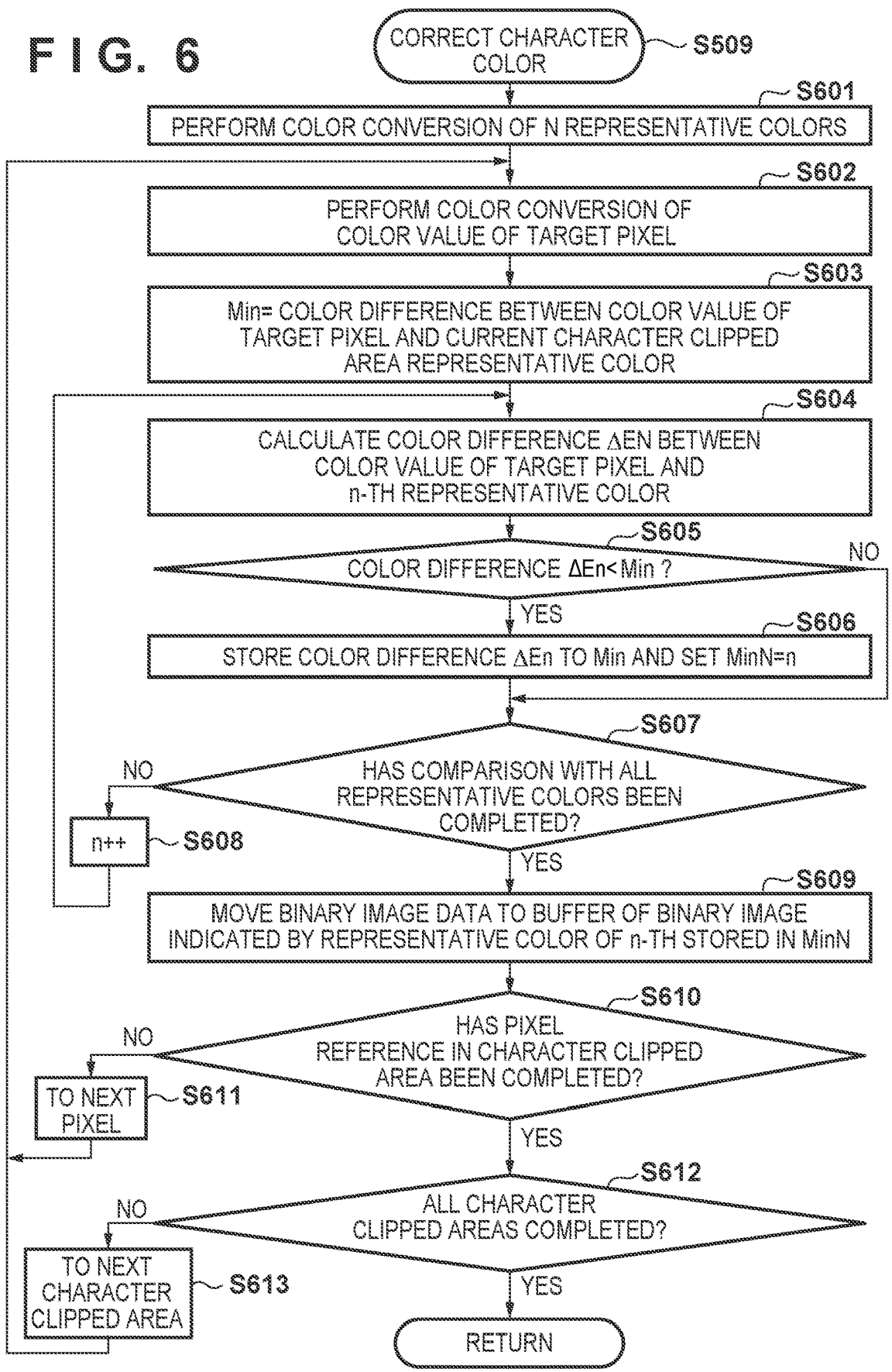
FIG. 6 is a flowchart for describing processing for correcting a character color by a character color correction module in step S509 in FIG. 5.

FIG. 6 is a flowchart for describing processing for correcting a character color by the character color correction module 209 in step S509 in FIG. 5. Also, while this flowchart is described, FIGS. 9A to 9C and FIGS. 10A to 10C are appropriately referred to.

Figure 9A:
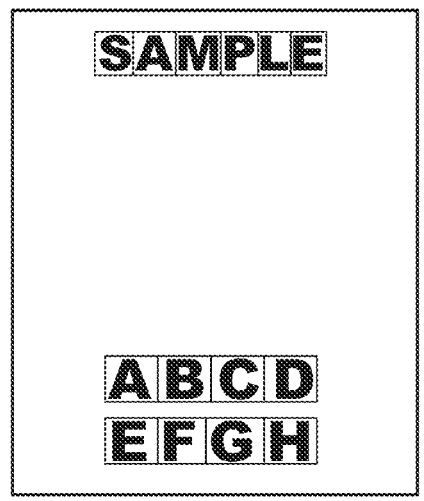
FIGS. 9A to 9C are diagrams for describing an example in which, after the character color correction module according to the first embodiment has performed correction processing regarding a character color, binary images are classified with respect to representative colors and are stored in the image buffer.
Figure 9B:
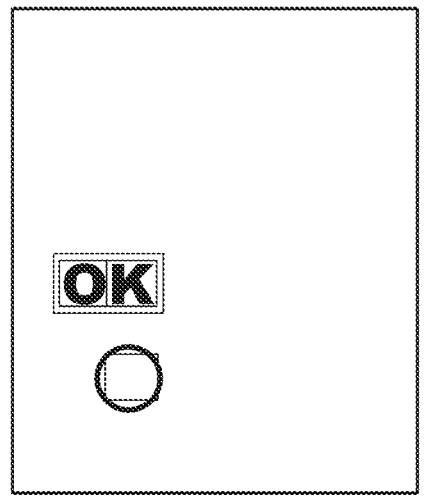
Figure 9C:

FIGS. 9A to 9C are diagrams for describing an example in which, after the character color correction module 209 according to the first embodiment has performed correction processing regarding a character color, binary images are classified with respect to representative colors and are stored in the image buffers.

Figures 10A, 10B, 10C:
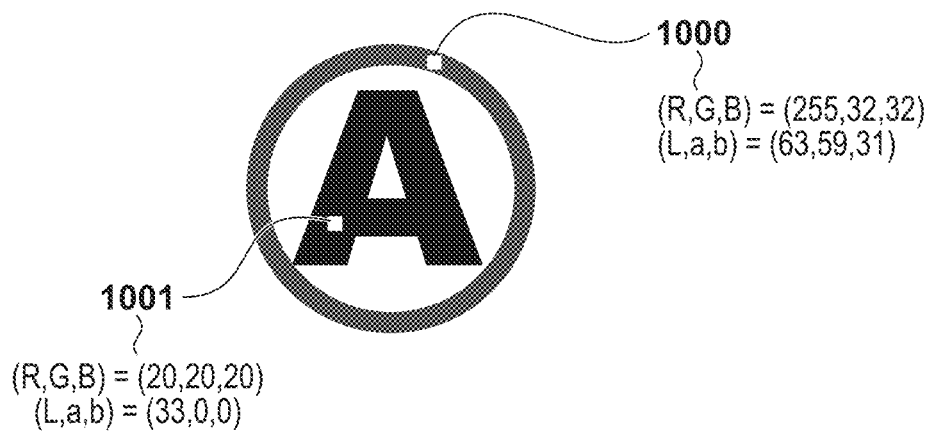
FIGS. 10A to 10C are diagrams for describing an example of processing for correcting a character color performed by the character color correction module according to the first embodiment.

FIGS. 10A to 10C are diagrams for describing an example of processing for correcting the character color by the character color correction module 209 according to the first embodiment.

First, in step S601, the CPU 103 performs color conversion of N representative colors of respective character clipped areas calculated by the representative color extraction module 207. Here, the representative colors calculated by the representative color extraction module 207 are in a luminance based color space represented by R, G, and B, and therefore the representative colors are converted to those in the Lab color space, which is a uniform color space. Note that the conversion from the RGB color space to the Lab color space can be realized using a standard conversion equation. Here, conversion to the Lab color space is performed in order to calculate a later-described color difference signal, but the conversion is not limited thereto, and may be converted to a YCbCr color space. Also, the later-described color difference may be calculated, in a simplified manner, from the color difference in the RGB color space, without performing the color space conversion.

FIG. 10B shows a view illustrating color values when the representative colors shown in FIGS. 8A to 8C are converted to color values in the Lab color space using a standard conversion equation. Here, the representative colors of No. 1 to No. 3 respectively correspond to the representative colors in FIGS. 8A to 8C. The Lab value of the representative color in FIG. 8A is (L,a,b)=(33,0,0), the Lab value of the representative color in FIG. 8B is (L,a,b)=(69,59,31), and the Lab value of the representative color in FIG. 8C is (L,a,b)=(46,33,15). Note that, in the first embodiment, a description will be given assuming that the number of representative colors N=3.

Next, the CPU 103 advances the processing to step S602, sequentially sets one black pixel of the black pixel portion in the binary image inside the character clipped area that has been determined as a character as a target pixel, and converts the RGB signal in the multivalued image corresponding to the position of the target pixel to a Lab signal.

FIG. 10A shows a view illustrating the multivalued image of a portion, shown in FIG. 7, in which the black character A is surrounded by a red circle frame. Here, when the target pixel 1000 is set to a target pixel of the red frame portion, the signal value in the multivalued image is assumed to (R,G,B)=(255,32,32). When this value is converted to the Lab value using a general conversion equation, (L,a,b)=(63, 59,31) is obtained. On the other hand, when the target pixel 1001 is set to a target pixel of the portion of the black character A, the signal value of the multivalued image is assumed to (R,G,B)=(20,20,20). When this value is converted to the Lab value, (L,a,b)=(33,0,0) is obtained.

Next, the CPU 103 advances the processing to step S603, and calculates a color difference ΔE from a Lab signal (L1,a1,b1) of the target pixel calculated in step S602 and a Lab signal (L2,a2,b2) of the representative color of the target character clipped area. This color difference ΔE can be calculated using following Equation (1).

$$\text{Color difference } \Delta E = \sqrt{(\Delta L \times \Delta L) + (\Delta a \times \Delta a) + (\Delta b \times \Delta b)} \quad \text{Equation (1)}$$

Here, $\Delta L = L1-L2$, $\Delta a = a1-a2$, and $\Delta b = b1-b2$, and $\sqrt{\phantom{x}}$ indicates a function of obtaining the square root. The color difference ΔE calculated here is stored in a variable Min provided in the RAM 104.

Next, the CPU 103 advances the processing to step S604, and calculates a color difference ΔEn from a Lab signal (L1,a1,b1) of the target pixel calculated in step S602 and a Lab signal (Ln,an,bn) of an $n^{th}$ (n is stored in the RAM 104, and the initial value of n is "1") representative color calculated in step S601. Next, the CPU 103 advances the processing to step S605, and determines whether or not the color difference ΔEn calculated in step S604 is smaller than Min. Then, if the color difference ΔEn is smaller than Min, that is, if the character color of the target pixel is closer to the $n^{th}$ representative color than to the representative color of the target character clipped area, the CPU 103 advances the processing to step S606. If not, the CPU 103 advances the processing to step S607. In step S606, the CPU 103 stores the color difference ΔEn to Min, and updates the representative color to the $n^{th}$ representative color with which the color difference from the color value of the target pixel is smaller. Here, in order to hold the $n^{th}$ color value information, n is set to a variable MinN provided in the RAM 104, and the number of the representative color whose color difference from the color value of the target pixel is smaller is stored.

Then, the CPU 103 advances the processing to step S607, and determines whether or not the comparison with all of the N representative colors has been completed with respect to the target pixel. If the comparison with all of the N representative colors has been completed, the CPU 103 advances the processing to step S609, and if not, the CPU 103 advances the processing to step S608. In step S608, the CPU 103 counts up the variable n, and advances the processing to step S604 in order to perform color difference comparison with the next representative color.

In step S609, the CPU 103 moves the binary image data to the buffer of the binary image indicated by the representative color whose number (n) is stored in the variable MinN. In this way, if a representative color is found that is closer to the color value of the target pixel than the representative color held for the current character clipped rectangular area, the color value of the target pixel is reproduced by the found representative color.

FIG. 10C shows a view illustrating an example of color differences between the color values of target pixels 1000 and 1001 and the respective representative colors. The color difference from the respective representative colors, with respect to the target pixel 1000, is the smallest with the representative color No. 2. In this case, the binary image corresponding to the target pixel 1000 is moved to the image buffer of the representative color No. 2. With this, the binary image of the red circle frame portion in FIG. 8C is moved from the buffer of the representative color (R,G,B)=(98,24, 24) in FIG. 9C to the image buffer of the representative color No. 2 shown in FIG. 9B.

Also, the color difference from the respective representative colors, with respect to the target pixel 1001, is the smallest with the representative color No. 1. In this case, the binary image corresponding to the target pixel 1001 is moved from the buffer of the representative color (R,G,B) =(98,24,24) in FIG. 9C to the image buffer of the representative color No. 1 in FIG. 9A. With this, the binary image of the black character "A" portion in FIG. 8C is moved to the image buffer of the representative color No. 1 as shown in FIG. 9A.

Accordingly, even in a case where a plurality of colors are present in one character clipped area, the character color can be suppressed from changing, and the character color can be appropriately reproduced.

Next, the CPU 103 advances the processing to step S610, and determines whether or not all of the black pixels in the binary image inside the character clipped rectangular area have been referenced, and if all of the black pixels have been referenced, the CPU 103 advances the processing to step S612. If all of the black pixels have not been referenced, the CPU 103 advances the processing to step S611, the CPU 103 sets the next black pixel as the target pixel, and advances the processing to step S602. In step S612, the CPU 103 determines whether or not the processing has been completed with respect to all of the character clipped rectangular areas. If the processing has been completed with respect to all of the character clipped rectangular areas, the CPU 103 ends this processing, and if not, the CPU 103 advances the processing to step S613, sets the next character clipped rectangular area as the target character clipped rectangular area, and advances the processing to step S602.

As described above, according to the first embodiment, when a character region is binarized, and the character color is reproduced by a representative color, the color value of a target pixel is compared with color values that have been extracted as the representative colors, and the representative color is re-selected that is closest to the color value of the target pixel. With this, even in a case where a plurality of colors are present in a multivalued image corresponding to a black pixel portion inside one character clipped area, the character color can be suppressed from being reproduced with a color that is different from the original color, and the character color can be appropriately reproduced.

Second Embodiment

In the above-described first embodiment, an example has been described in which the color value of a target pixel is compared with color values that have been extracted as the representative colors, and the representative color is obtained that is closest to the color value of the target pixel. However, there are cases where, when the color value of a target pixel is compared with color values that have been extracted as the representative colors, comparison computations need to be performed whose load depends on the number of black pixels included in a character clipped rectangular area that has been determined as a character, and the number of colors that have been extracted as the representative colors, and processing speed decreases. Therefore, in a second embodiment, an example will be described in which it is determined whether or not a plurality of colors are present inside the character clipped rectangle, and a character color correction module 209 performs processing only on character clipped rectangular areas that have been determined as a character and to include a plurality of colors. Note that the hardware configuration and the like of an image processing apparatus according to the second embodiment is similar to those of the above-described first embodiment, and therefore the description thereof will be omitted. Also, the processing for compressing image data performed by a compression/decompression unit 114 according to the second embodiment is the same as the processing shown in the above-described flowchart in FIG. 5, but the processing for correcting the character color in step S506 differs from that in the first embodiment (FIG. 6). This will be described later with reference to FIG. 13.

Figure 12:
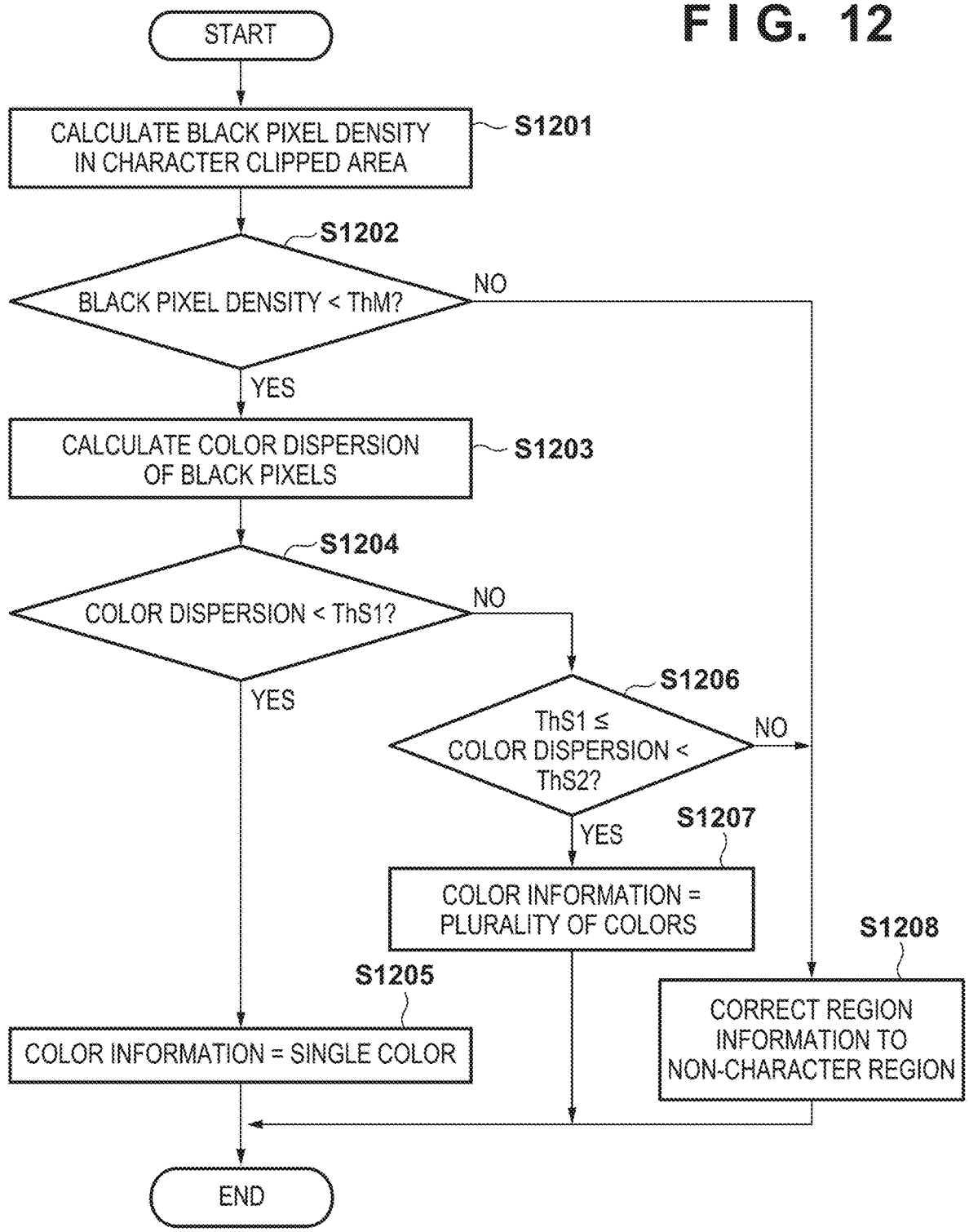
FIG. 12 is a flowchart for describing processing with respect to one character clipped area performed by a region determination module according to a second embodiment.

FIG. 12 is a flowchart for describing processing, with respect to one character clipped area, that is performed by a region determination module 205 according to the second embodiment. The processing shown in the flowchart in FIG. 12 is achieved by a CPU 103 executing a program deployed in the aforementioned RAM 104.

First, in step S1201, the CPU 103 calculates a black pixel density from a binary image in a character clipped area. The black pixel density can be obtained by dividing the number of black pixels inside the character clipped area by the number of pixels in the character clipped area. Next, the CPU 103 advances the processing to step S1202, and determines whether or not the black pixel density obtained in step S1201 is smaller than a threshold value ThM. Here, if it is determined that the black pixel density is smaller than the threshold value ThM, the CPU 103 advances the processing to step S1203, and if not, the CPU 103 advances the processing to step S1208.

In step S1203, the CPU 103 calculates a color dispersion from the multivalued image corresponding to black pixel positions in the binary image in the character clipped area. Specifically, RGB values are converted to Lab values, and variance values of a and b at the black pixel position portion are calculated. The CPU 103 advances the processing to step S1204, and determines whether or not the color dispersion obtained in step S1203 is smaller than a threshold value ThS1. Here, if it is determined that the color dispersion is smaller than the threshold value ThS1, the CPU 103 advances the processing to step S1205, and if not, the CPU 103 advances the processing to step S1206. Here, in order to determine a character clipped area that is obviously a single color, "50" is set to the threshold value ThS1, but there is no limitation thereto. In step S1205, the CPU 103 outputs a result stating that the color information of the character clipped area has been determined to be a single color, and ends this processing. That is, here, if the density of black pixels in the character clipped area is smaller than a first predetermined value (threshold value ThM), and the color dispersion of the black pixels is smaller than a second predetermined value (threshold value ThS1), it is determined that the character color information of the character clipped area is a single color.

On the other hand, if the color dispersion is larger than the threshold value ThS1, in step S1206, the CPU 103 determines whether or not the color dispersion obtained in step S1203 is greater than or equal to the threshold value ThS1 and less than a threshold value ThS2 (ThS1<ThS2). If the above condition is satisfied, the CPU 103 advances the processing to step S1207, and if not, the CPU 103 advances the processing to step S1208. Here, the threshold value ThS2 is a threshold value for discriminating a character clipped area that has a large number of colors and is obviously not a character, and is "300" here, for example, but there is no limitation thereto. In step S1207, the CPU 103 outputs a result stating that the color information of the character clipped area has been determined to be a plurality of colors, and ends this processing. That is, here, when the density of black pixels in the character clipped area is smaller than the first predetermined value, and the color dispersion of the black pixels is larger than the second predetermined value, but the character clipped area can be determined to be a character, it is determined that the character color information of the character clipped area is a plurality of colors.

Also, if the density of black pixels in a character clipped area is larger than the threshold value ThM, in step S1208, the CPU 103 determines that the character clipped area is a non-character region, and corrects the character region information generated by a region determination module 203 and the character clipping information generated by a character clipping module 204. That is, the CPU 103 removes this character clipped area from the character region information and the character clipping information, and ends this processing.

Figure 13:
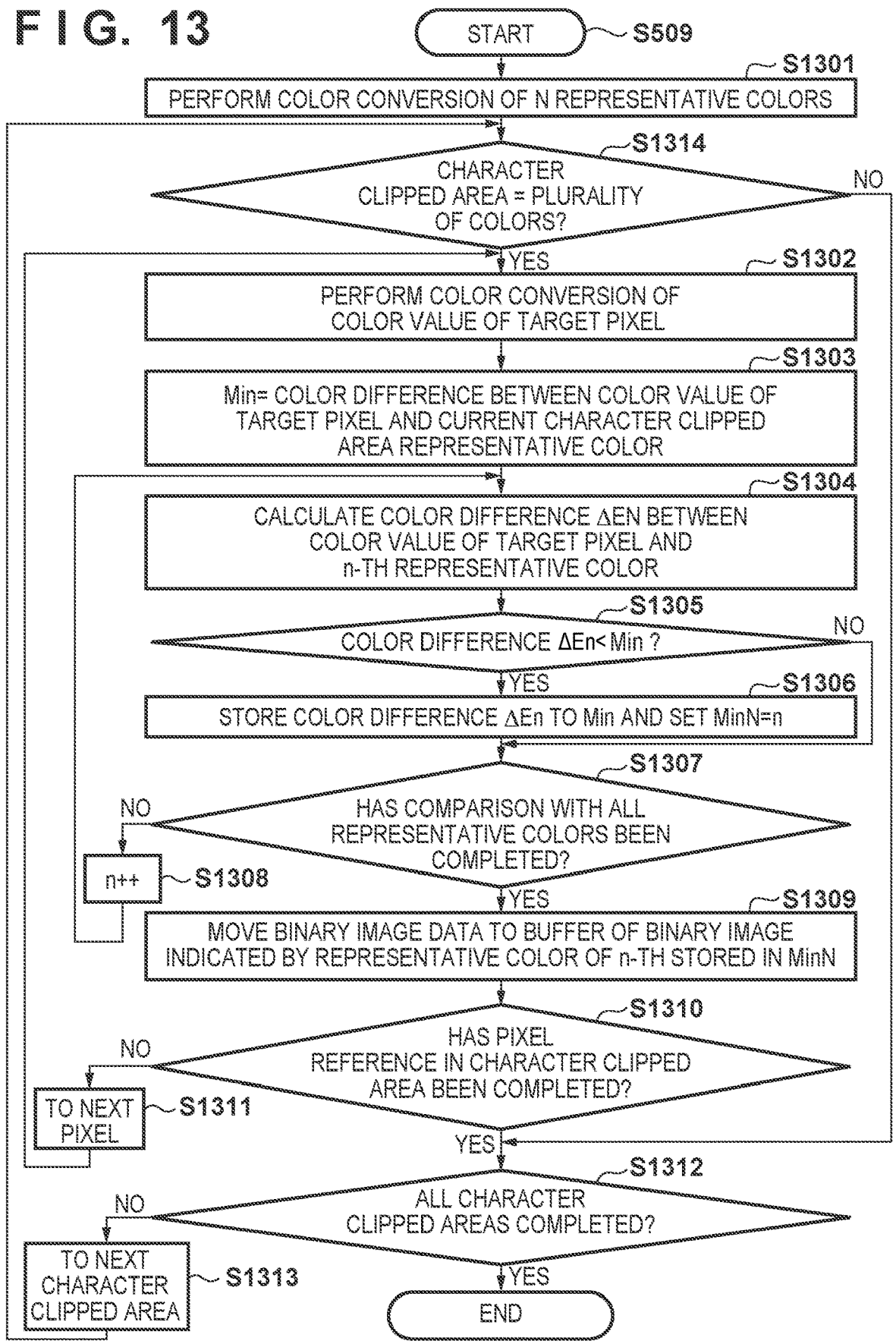
FIG. 13 is a flowchart for describing processing for correcting the character color by a character color correction module according to the second embodiment in step S509 in FIG. 5.

FIG. 13 is a flowchart for describing processing for correcting the character color by the character color correction module 209 according to the second embodiment in step S509 in FIG. 5. Note that the processing in steps S1301 to S1313 in FIG. 13 is the same as the aforementioned processing in steps S601 to S613, and therefore the description thereof will be omitted.

In step S1314, the CPU 103 refers to the color information of the character clipped area generated in step S1205 or S1207 in FIG. 12, and determines whether or not a plurality of character colors are present in the character clipped area. Here, if it is determined that the plurality of character colors are present in the character clipped area, the CPU 103 advances the processing to step S1302, and executes the processing similar to that in above-described FIG. 6. On the other hand, if it is determined that a single character color is present in the character clipped area, the CPU 103 skips the processing in FIG. 6, and advances the processing to step S1312.

As described above, according to the second embodiment, it is determined whether or not a plurality of character colors are present in a character clipped area, and only if there are a plurality of character colors, processing similar to that in the above-described first embodiment is executed. With this, the processing for correcting the character color is suppressed from being performed on all of the character clipped areas. Accordingly, reduction in the processing speed is suppressed, and the character colors are suppressed from being reproduced in colors different from the original colors, and as a result, the character colors can be appropriately reproduced.

Note that, in the second embodiment, when determining whether or not a plurality of character colors are present in a character clipped area, the color dispersion is used, but the present invention is not limited thereto. For example, a configuration may be such that color sets are generated by generating a two-dimensional or three-dimensional histogram of RGB values or Lab values of a multivalued image, and it is determined whether or not a plurality of colors are present based on the number of sets.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-169119, filed Sep. 10, 2018, which is hereby incorporated by reference herein in its entirety.

What is claimed is:

1. An image processing apparatus, comprising:
a memory device that stores a program; and
at least one processor that executes the program stored in the memory device to cause the image processing apparatus to function as:
a conversion unit configured to convert a multivalued image to a binary image;
a first determination unit configured to determine a character region and a non-character region in the binary image;
a character clipping unit configured to extract areas in units of a character from a region determined to be the character region by the first determination unit;
a second determination unit configured to determine whether each of the areas in units of a character is a character region or a non-character region;
a generation unit configured to extract, for each of the areas in units of a character that have been determined to be the character region by the second determination unit, a first representative color from the multivalued image included in the area in units of a character, and generate a binary image of the area in units of a character corresponding to the first representative color;
a decision unit configured to decide a second representative color closest to a color of a target pixel by comparing the first representative color with a color of the target pixel in the area in units of a character; and
a changing unit configured to change the binary image of the area in units of a character corresponding to the first representative color generated by the generation unit to a binary image of the second representative color decided by the decision unit.

2. The image processing apparatus according to claim 1, wherein the conversion unit is configured to convert a pixel, included in the multivalued image, whose density is greater than or equal to a threshold value to a black pixel, and convert a pixel whose density is less than the threshold value to a white pixel.

3. The image processing apparatus according to claim 1, wherein the first determination unit is configured to extract a cluster of black pixels by tracing a contour of black pixels in the binary image, and determine which of the character region and the non-character region the area is, using at least one of a size, a shape, density of black pixels of the cluster of black pixels.

4. The image processing apparatus according to claim 1, wherein the at least one processor executes the program stored in the memory device to further cause the image processing apparatus to function as a reducing unit configured to reduce the multivalued image,
   wherein the generation unit is configured to specify positions of pixels constituting respective characters in the areas in units of a character that have been determined to be the character region, and extract the first representative color in each of the areas in units of a character by referring to colors at corresponding positions in a multivalued image that has been reduced by the reducing unit, based on the specified positions of pixels of a character.

5. The image processing apparatus according to claim 4, wherein the generation unit is configured to extract the first representative color based on an average or a weighted average of colors of the multivalued image corresponding to a group of black pixels in the binary image in each of the areas in units of a character.

6. The image processing apparatus according to claim 4, wherein the generation unit is configured to extract the first representative color based on a color that most frequently appears in a group of black pixels in the binary image in each of the areas in units of a character.

7. The image processing apparatus according to claim 1, wherein the at least one processor executes the program stored in the memory device to further cause the image processing apparatus to function as a third determination unit configured to determine whether or not the generation unit has extracted a plurality of the first representative colors with respect to each of the areas in units of a character,
   wherein the decision unit is configured to, upon determining that the generation unit has extracted the plurality of the first representative colors, decide the second representative color that is closest to a color of the target pixel from the plurality of first representative colors.

8. The image processing apparatus according to claim 7, wherein the third determination unit is configured to calculate color dispersion from the multivalued image corresponding to the positions of black pixels in the binary image in each of the areas in units of a character, and determines, if the color dispersion is less than a first threshold value, the area in units of a character is an area of a single color, and determines, if the color dispersion is greater than or equal to the first threshold value and less than a second threshold value, the area in units of a character is an area of a plurality of colors.

9. The image processing apparatus according to claim 1, wherein the at least one processor executes the program stored in the memory device to further cause the image processing apparatus to function as a compression unit configured to perform binary lossless compression on a binary image that has been changed by the changing unit.

10. An image processing method comprising:
   converting a multivalued image to a binary image;
   determining a character region and a non-character region in the binary image;
   extracting areas in units of a character from a region determined to be the character region;
   determining whether each of the areas in units of a character is a character region or a non-character region;
   extracting, for each of the areas in units of a character that have been determined to be the character region, a first representative color from the multivalued image included in the area in units of a character, and generating a binary image of the area in units of a character corresponding to the first representative color;
   deciding a second representative color closest to a color of a target pixel by comparing the first representative color with a color of the target pixel in the area in units of a character; and
   changing the generated binary image of the area in units of a character corresponding to the first representative color to a binary image of the decided second representative color.

11. A non-transitory computer-readable storage medium storing a program for causing a processor to execute an image processing method comprising:
   converting a multivalued image to a binary image;
   determining a character region and a non-character region in the binary image;
   extracting areas in units of a character from a region determined to be the character region;
   determining whether each of the areas in units of a character is a character region or a non-character region;
   extracting, for each of the areas in units of a character that have been determined to be the character region, a first representative color from the multivalued image included in the area in units of a character, and generating a binary image of the area in units of a character corresponding to the first representative color;
   deciding a second representative color closest to a color of a target pixel by comparing the first representative color with a color of the target pixel in the area in units of a character; and
   changing the generated binary image of the area in units of a character corresponding to the first representative color to a binary image of the decided second representative color.

* * * * *